Jan. 29, 1952 M. A. AMER 2,583,803
BODY SUPPORTED MIRROR HOLDER DEVICE
Filed March 10, 1950

INVENTOR.
Myrtle A. Amer
BY
Robt. W. Pearson
ATTORNEY.

Patented Jan. 29, 1952

2,583,803

UNITED STATES PATENT OFFICE 2,583,803

BODY SUPPORTED MIRROR HOLDER DEVICE

Myrtle A. Amer, Long Beach, Calif.

Application March 10, 1950, Serial No. 148,959

4 Claims. (Cl. 88—101)

This invention relates to a mirror holder.

More specifically speaking, the invention pertains to an adjustable yoke-like member constructed and arranged to seat upon a person's shoulders and usable to support a mirror in a position for the wearer to get a close-up view of his or her face.

Although it is not new, in the art to which this invention pertains, to provide mirror supporting means which pass astride the neck of the wearer and rest upon his or her shoulders yet such devices have heretofore lacked much that is to be desired in regard to simplicity and low cost of manufacture.

Accordingly it is among the objects of this invention to provide a mirror support mountable on the human body which will consist of fewer parts, be producable at a lower manufacturing cost, will be more durable, and will be less apt to get out of order.

Another object is to provide a mirror support of the kind stated which can be more quickly adjusted to support the mirror at the proper height and spacing in relation to the face of the user.

Other objects, advantages and features of invention may hereinafter appear.

Referring to the accompanying drawing, which illustrates preferred embodiments of the invention, now reduced to practice, Fig. 1 is a perspective view, on a smaller scale than the other views, illustrating the device in use to support a mirror in a close-up, forward relation to the lady's face. This view includes a fragment of a larger wall mirror in relation to which the device is so positioned as to enable the lady to view the back of her head by combining the use of the larger and smaller mirror.

Figure 5:
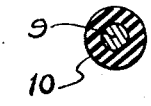
Fig. 5 is a cross section on line 5—5 of Fig. 3, the scale being enlarged.

Referring in detail to the drawing, the smaller mirror 7 therein shown, is mounted upon the front end portion of a yoke 8 consisting of a cord or small cable having form retaining stiffness sufficient to support its own weight together with the weight of said mirror. As shown in Fig. 5 said cord has a wire cord 9 surrounded by a sheath 10 desirably made of rubber or a rubber-like material. A sheathed copper wire, of the kind commonly used for electrical conduction will serve the purpose well.

Figure 1:
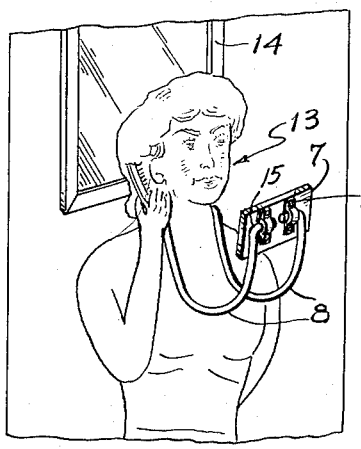
Figure 2:
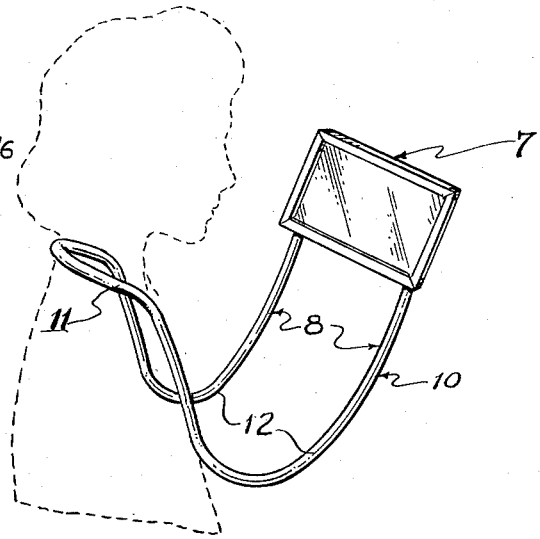
Fig. 2 is a perspective view similar to Fig. 1, but viewing somewhat from the rear both the device and mirror supported thereby.

As shown in Figs. 1 and 2, said yoke 8 has a relatively short, arcuate midlength portion, or run, 11 to abut against the back side of the user's neck, and a much longer, downwardly directed arcuate run 12 at each side, said side runs 12 joining the ends of said run 11 to the back portion of the rectangular mirror 7. It will be seen that the mirror is thus conveniently supported in a close-up forward relation to the face 13 of the user so that she may, in the smaller mirror, see the back of her head as imaged in the larger mirror 14 shown mounted upon a wall.

The outer end portions of the twin yoke runs 12 are shown upwardly directed and furnished with inwardly directed, horizontal terminal portions 15 which abut against the back of the mirror 7 and pass turnably under the arcuate midlength portions of a pair of clips 16, the end portions of said clips being fastened to the mirror by any suitable conventional means. Said clips engage the yoke ends 15 with a sufficient pressure adjustably to hold the mirror 7 in the various positions to which it may be tilted about the horizontal axis afforded by the yoke ends 15.

Figure 3:
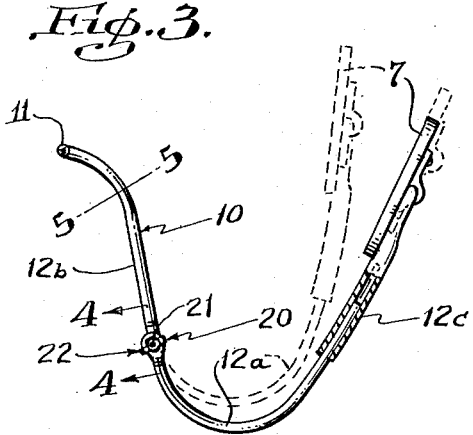
Fig. 3 is a side elevation showing the device by itself and illustrating a modification wherein an auxiliary means is used to aid in adjusting the position of the mirror.

In Fig. 3 is a shown a modification wherein the already described yoke runs 12 are each represented by a lower section 12a and a back, upwardly directed section 12b, the latter sections joining the neck portion 11, which remains unchanged; and at each side of the device said sections 12a and 12b are swingably connected by a joint structure 20 having a pivot screw 21 furnished at each side of the device, so that the angular relation of the sections 12a and 12b to each other may be changed, thereby changing the position of the mirror 7 in relation to the face of the user. The arcuate arm sections 12a extend backwardly and then upwardly a short distance before they are united to the joint structures 20.

Also in Fig. 3, the outer end portions of the runs 12a are shown frictionally telescoped into tubular terminal sections 12c which are attached to the back of the mirror in the same manner as the corresponding parts shown in Fig. 1. This telescopic arrangement widens the range of adjustment of the mirror 7.

In both the embodiments of the invention adjustment of the mirror 7 may be effected by altering the shape of the form-retaining cord of which the mirror-supporting yoke is formed.

Figure 4:
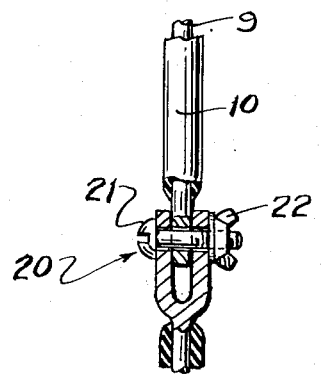
Fig. 4 is a fragmentary cross-section on line 4—4 of Fig. 3, the scale being enlarged.

And furthermore, by more or less arcuating the midlength portion 11 of the yoke it may be made to fit snugly and comfortably around the back of the neck of the user. However, when the device is constructed as shown in Figs. 3 and 4 the yoke forming cord may be made of stiffer, more sturdy material, and adjustment effected, at least in part, by use of the clamp and joint structure 20 and by varying the extent to which the runs 12c are telescoped over the runs 12a.

In both embodiments of the device the front portions of the arcuate run 11 rest upon the shoulders of the user and the adjacent lower parts of the yoke rest upon the side portions of the upper part of the chest, thus providing a very stable support for the mirror 7.

I claim:

1. In a device mountable upon the human body to support a mirror in a close-up forward relation to the face of the user, a single piece of cord having a form-retaining stiffening means therearound, said cord having a midlength portion arcuated comfortably to engage the back of the neck of a person wearing the device, and a side run continuous with each end of said arcuated midlength portion, the side runs thus provided resting upon the body of the wearer when the device is in use and having forwardly extending portions by and between which the mirror is supported, and, considering the device in its mounted position, each end portion of said cord having an upwardly directed part connected to the mirror, substantially abutting the back thereof.

2. The subject matter of claim 1, and, each end portion of said cord being horizontally directed toward and terminating adjacent to the opposite end of the cord, and means swingably fastening the supported mirror to said horizontal end portions, so that said mirror is adjustable about a horizontal axis.

3. In a device mountable upon the human body to support a mirror in a close-up forward relation to the face of the user, a single piece of cord having a form-retaining stiffening sheath therearound, said cord having a midlength portion arcuated comfortably to engage the back of the neck of a person wearing the device, and a side run continuous with each end of said arcuated midlength portion, the side runs thus provided resting upon the body of the wearer when the device is in use and having front portions which extend forwardly and then upwardly to the mirror, their upwardly extending portions terminating in short horizontal runs which are directed toward each other, and a pair of clips swingably connecting the mirror with said terminal horizontal runs.

4. In a device maintainable upon the human body to support a mirror in a close-up forward relation to the face of the user, a single piece of cord having a midlength portion arcuated comfortably to engage the back of the neck of a person wearing the device, and a side run continuous with each end of said arcuate midlength portion, the side runs thus provided resting upon the body of the wearer when the device is in use and having forwardly extending portions by and between which the mirror is supported said cord possessing a sufficient stiffness to maintain in an operative position its said forwardly extending portions together with the weight of said mirror positioned as aforesaid.

MYRTLE A. AMER.

REFERENCES CITED

The following references are of record in the file of this patent:

UNITED STATES PATENTS

| Number | Name | Date |
| --- | --- | --- |
| 893,998 | Harris | July 21, 1908 |
| 956,032 | Birdwell | Apr. 26, 1910 |
| 1,183,747 | McIntire | May 16, 1916 |
| 1,317,934 | Mohr | Oct. 7, 1919 |
| 2,277,241 | Lynch | Mar. 24, 1942 |
| 2,327,096 | Dann | Aug. 17, 1943 |

FOREIGN PATENTS

| Number | Country | Date |
| --- | --- | --- |
| 18,509 | Great Britain | Aug. 11, 1909 |
| 313,265 | Great Britain | June 13, 1929 |